United States Patent [19]

Raymond et al.

[11] 4,021,580

[45] May 3, 1977

[54] PREPARATION OF AN ALCOHOLIC MALT BEVERAGE BASE

[75] Inventors: Leonard Raymond, White Plains, N.Y.; John B. Bockelmann, Tenafly, N.J.; William Tirado, Jr., Oceanside, N.Y.

[73] Assignee: The F. & M. Schaefer Brewing Company, Brooklyn, N.Y.

[22] Filed: Mar. 22, 1976

[21] Appl. No.: 669,514

Related U.S. Application Data

[63] Continuation-in-part of Ser. No. 562,934, March 28, 1975, abandoned.

[52] U.S. Cl. .................................. 426/16; 426/29; 426/592

[51] Int. Cl.² ...................... C12C 7/00; C12C 11/04

[58] Field of Search ................. 426/11, 13, 15, 29, 426/592

[56] References Cited

UNITED STATES PATENTS

| | | | |
|---|---|---|---|
| 2,206,719 | 7/1940 | Draeger | 426/16 X |
| 2,803,546 | 8/1957 | Bergmann et al. | 426/13 |
| 3,332,779 | 7/1967 | Krabbe et al. | 426/16 |
| 3,379,534 | 4/1968 | Gablinger | 426/13 X |
| 3,798,331 | 3/1974 | Bavisotto et al. | 426/16 |

FOREIGN PATENTS OR APPLICATIONS 880,876   9/1971   Canada

*Primary Examiner*—David M. Naff
*Attorney, Agent, or Firm*—Wenderoth, Lind & Ponack

[57]  ABSTRACT

An alcoholic malt beverage base is produced by preparing wort having a solids content of about 18° to 24° plato from an all malt mash, adding fermentable sugar to the wort, boiling to resultant sugar-containing wort, adding water to the boiled wort to adjust the solids content, adding yeast to the boiled wort after cooling and fermenting for a certain time and at a certain temperature, adding additional yeast, continuing fermentation at a higher temperature to a desired end point, cooling the fermented wort and separating solids therefrom. The beverage base has an alcohol content of about 5.5% to 9% and has a clean pleasant taste without off-aromas.

1 Claim, No Drawings

PREPARATION OF AN ALCOHOLIC MALT BEVERAGE BASE

This application is a continuation-in-part of application Ser. No. 562,934, filed Mar. 28, 1975, now abandoned.

The present invention relates to a process for the production of alcoholic malt beverages and to the beverages thus produced. The present invention, through a process of fermentation using an all malt mash and brewers yeast, enables the production of a high alcoholic content malt substrate which itself possesses a pleasant taste and which may be used as a beverage or which may be admixed with other materials to form a beverage having the desired taste and color characteristics.

In the past, efforts have been conducted toward producing, by fermentation processes, neutral tasting alcoholic substrates which may be used as base materials in producing alcoholic beverages which may be used as base materials in producing alcoholic beverages having certain desired flavor characteristics. In this respect, see Krabbe et al. U.S. Pat. No. 3,332,779 and Bavisotto et al. U.S. Pat. No. 3,798,331. These processes, however, suffer from the disadvantage that the alcoholic content of the resultant substrate or base is not as high as one would desire. The present applicants have discovered a process by which an alcoholic malt beverage base having a higher alcoholic content may be produced. Additionally, the substrate resulting from the instant fermentation process itself has a pleasant, clean taste with no off-aromas and thus may be employed as a beverage or may be used as a base material and admixed with other materials to form a beverage having certain desired taste and color characteristics.

In the instant description and claims the substrate resulting from the fermentation process is referred to as the "alcoholic malt beverage base" or "base". It is, however, to be understood that this material has pleasant taste characteristics and may itself be consumed as a beverage.

In accordance with the process of the present invention an all malt mash is prepared. The mash may be formed by admixing, in a mash tub, water, malt and gypsum in amounts conventional in the brewing industry. The mash is subjected to heating to obtain proteolytic conversion, amyolytic conversion and destruction of enzymes. In accomplishing these objectives, the all malt mash is heated to a temperature of from about 142° to about 145° F and held at this temperature for a period of from about 15 to about 30 minutes (protein rest). The temperature is then increased to from about 150° to about 160° F and held for a period of from about 40 to about 50 minutes (amyolytic conversion). After this period, the temperature is again increased to from about 165° to about 170° F for destruction of enzymes.

The mash is then drained to obtain the first wort. It is only the first wort which is employed in the process of the present invention. The spent grain may be sparged but the spargings are not added to the first wort employed in the instant process. These spargings may be taken off and employed in a conventional brewing operation.

The first wort will have a relatively high solids content of about 18° to about 24° P. (Plato).

Fermentable sugar, e.g., brewery corn syrup, is then added to the first wort and the wort boiled for about 15 to about 30 minutes. The fermentable sugar is added is an amount such that the percent solids in the wort after boiling is from about 20° to about 32° P. with an amount of about 30° to about 32° P. being preferred. The solids are made up of from about 60 to about 40% solids from the malt and from about 40 to about 60% solids from the fermentable sugar. A ratio of about 50% to 50% is preferred. At this stage the wort is unhopped. At the time of addition of the fermentable sugar, a clarifying agent such as Irish moss can be added as well as salt for improving flavor.

After boiling the percent solids is adjusted by addition of water to a value of from about 20° to about 29.5° P. with an amount of about 28.5° to about 29.5° P. being preferred. The wort is transferred to a fermenter and cooled to a temperature of about 52° F, aerated and pitched with normal brewers yeast, e.g., *Saccharomyces cerevisiae* or *S. carlsbergensis*. The pitching rate is about 1.75 pounds of yeast per barrel of wort. Fermentation is thus initiated. The fermentation is very vigorous at the start and for about the first 72 hours. After 10 to 12 hours additional yeast is added (from about .25 to .50 pounds per barrel of wort). Over about the first 72 hours of fermentation the temperature is allowed to rise to about 65° F and is held at this value until fermentation is substantially complete. Fermentation is complete after about 2½ to 3 weeks.

At this point the fermented wort is cooled to a temperature of about 35° F and the solids are allowed to settle for about 3 days. The liquid is decanted off and filtered to obtain the alcoholic malt beverage base. Filtering aids can, of course, be employed if desired.

This resulting base is an extremely clean tasting alcoholic base with no off-aromas. It contains a high alcoholic content ranging from about 5.5% up to about 9% by weight and above. The alcoholic content of the base can, of course, be controlled by the length of time the fermentation is permitted to continue.

In the event the base is itself to be used as the final beverage, it can be carbonated, if desired, and packaged by means well known in the art. It can be stabilized against microbiological spoilage by incorporating preservative agents prior to packaging, such agents being known in the brewing art; or, it can be subjected to pasteurizing after packaging by means also known in the art.

The alcoholic malt beverage base can subsequently be processed to produce beverages having various desired alcoholic content, flavor and color characteristics. This is accomplished by admixing the base with the necessary additives and/or diluents to achieve the desired final product.

Government regulations require that a "malt" alcoholic beverage contain a certain minimum amount of hop. Thus, a pre-isomerized hop extract, e.g., Isolone 1034, may be included among the additives employed.

The base can be carbonated according to methods which are conventional in the art, and can be flavored by the addition of various natural and/or artificial flavoring agents and colored by the addition of conventional coloring agents. Conventional flavoring agents such as fruit syrups, cola syrups, and the like can be used. If desired, agents to improve the foam properties, coloring agents, food grade acids, sweeteners and buffer salts can be added. Packaging of the final beverage and preservation against microbial spoilage are achieved by means well known in the art.

The particular amounts of the additives are not critical and are chosen to yield the particularly desired characteristics of the final product beverage sought.

In order to more particularly illustrate the present invention, the following examples are presented. These examples are purely illustrative and not exhaustive.

EXAMPLE 1

31 Gallons (1 barrel) of high alcohol base is prepared utilizing the following ingredients:

| INGREDIENT: | | AMOUNT |
|---|---|---|
| Malt | pounds | 150.000 |
| Calcium sulfate | " | 0.3888 |
| Irish moss | " | 0.0277 |
| Salt | " | 0.0388 |
| Brewery Corn Syrup (85 % solids) | " | 43.922 |
| Brewers pitching yeast | " | 1.75 |
| Water | " | 386.9553 |

The alcoholic malt base of this invention is prepared in the following manner:

A mash is prepared using 386.9553 lbs. of water at about 145° F, 150.000 lbs. of malt and 0.3888 lbs. of calcium sulfate. The mash is held at about 145° F for about 15 min. The temperature is then increased to from about 150° to about 160° F and held for a period of from about 40 to about 50 minutes. The temperature is then raised to about 165° – 170° F for destruction of enzymes. The resultant mash is then drained into a kettle to obtain the first wort having a solids content of about 18° to about 24° P. To the wort is added 43.922 pounds of brewery corn syrup (85% solids), 0.0388 pounds of salt and 0.0277 pounds of Irish Moss. The wort is boiled for approximately 20 minutes, and the kettle wort is transferred to a coolship for the separation of the hot trub. Water is added as necessary to achieve a percent solids of from about 28.5° to 29.5° P.

The wort is then passed through a wort cooler, and cooled to approximately 50° F and aerated. The cooled, aerated wort is transferred to a starter tank and pitched with 1.75 pounds of brewers yeast per barrel of wort (*Saccharomyces cerevisiae* or *S. carlsbergensis*), and again aerated.

After 10 to 11 hours, the mixture is transferred to a fermenter tank at 52° F, additional brewers yeast is added in an amount of 0.5 lbs. per barrel of wort and the mixture allowed to ferment to a maximum temperature of 65° F over a period of about 60 hours and maintained at 65° F until 0.5° P. above end-fermentation, and then cooling is applied to reach 42° F. When the fermented wort reaches 0.2° P. above end-fermentation, it is cooled to 32° F.

The approximate time of fermentation is 2 to 3 weeks. The fermenter contents are transferred to a storage tank under carbon dioxide counter pressure. After 3 days at 32° F, the yeast has settled out, and the product is filtered through diatomaceous earth to obtain a brilliant base. The base may be used by itself or to prepare a flavored beverage. The alcoholic content of the base is about 9% by weight.

EXAMPLE 2

The alcoholic malt base is employed to prepare final beverages having the desired flavor, color and alcoholic content characteristics by adding flavoring agents and the like as necessary. The following Table sets forth illustrative beverages.

EXAMPLE OF FINAL BEVERAGES
Percent by Weight

| Ingredients | San Gria | Lemon-Tea | Apple | Lemon-Lime | Sweet Cider |
|---|---|---|---|---|---|
| Alcoholic Malt Base | 32.907 | 32.816 | 31.277 | 33.291 | 33.430 |
| Isomerose | 8.198 | 8.172 | 9.958 | — | — |
| Sugar Syrup (67° Brix) | — | — | — | 8.788 | 9.680 |
| Citric Acid | 0.217 | 0.200 | — | 0.256 | 0.224 |
| Malic Acid | — | — | 0.255 | — | — |
| Flavor-San Gria | 0.179 | — | — | — | — |
| Flavor-Lemon | — | 0.079 | — | — | — |
| Flavor-Tea | — | 0.309 | — | — | — |
| Flavor-Apple | — | — | 0.079 | — | — |
| Flavor-Lemon-Lime | — | — | — | 0.707 | — |
| Flavor-Sweet Cider | — | — | — | — | 0.078 |
| Sodium Benzoate | 0.024 | 0.025 | 0.023 | — | — |
| Water | 58.375 | 58.399 | 58.408 | 56.958 | 56.588 |

What is claimed is:
1. A method for the production of an alcoholic malt beverage base which comprises
preparing an all malt mash,
draining the mash to obtain the first wort having a percent solids content of about 18° to about 24° P.,
adding fermentable sugar to the first wort in an amount such that the percent solids present is made up of from about 60% to about 40% solids from the malt and from 40% to about 60% solids from the fermentable sugar and subjecting the wort to boiling, the percent solids in the wort after boiling being from about 30° to about 32° P.,
adjusting the percent solids in the wort by addition of water to a value of from about 28.5° to about 29.5° P.,
cooling the wort,
initiating fermentation in the wort with brewers yeast at a temperature of about 52° F and a pitching rate of about 1.75 pounds of yeast per barrel of wort,
continuing the fermentation at a temperature of about 52° F for a period of about 10 to 12 hours,
adding additional brewers yeast in an amount of from about 0.25 to about 0.5 pounds per barrel of wort and continuing the fermentation for an additional time of about 60 hours while permitting the temperature to rise to about 65° F,
continuing fermentation while maintaining the temperature at about 65° F to the desired end point,
cooling the fermented wort,
separating the solids therefrom and decanting off and filtering the liquid to obtain the desired malt beverage base having an alcohol content ranging from about 5.5% to about 9% by weight.

* * * * *